United States Patent [19]

Magnafici

[11] Patent Number: 5,839,687
[45] Date of Patent: Nov. 24, 1998

[54] MEANS AND METHOD FOR TRANSFERRING FISHING LINE FROM A STORAGE SPOOL TO A FISHING REEL ON A FISHING ROD

[76] Inventor: William E. Magnafici, 115 Sunset Dr., Amboy, Ill. 61310

[21] Appl. No.: 801,913

[22] Filed: Feb. 14, 1997

[51] Int. Cl.[6] .................................................. B65H 75/38
[52] U.S. Cl. ..................... 242/404.3; 242/129.8; 242/422.4; 242/597.8; 242/902
[58] Field of Search ................... 242/902, 129.7, 242/129.71, 129.8, 597.5, 597.6, 597.8, 422.4, 404.3, 422.9; 43/25

[56] References Cited

U.S. PATENT DOCUMENTS

| | | | |
|---|---|---|---|
| 359,712 | 3/1887 | Catlin | 242/129.8 X |
| 417,151 | 12/1889 | Cooney | 242/129.71 |
| 582,770 | 5/1897 | Watson | 242/129.7 |
| 873,506 | 12/1907 | Clark | 242/129.71 |
| 2,084,251 | 6/1937 | Haislip | 242/902 X |
| 3,261,569 | 7/1966 | Bedell | 242/902 X |
| 3,298,127 | 1/1967 | Bedell | 242/129.71 |
| 3,402,501 | 9/1968 | Davis | 242/129.8 X |
| 3,693,903 | 9/1972 | Cassel et al. | 242/129.8 |
| 3,799,471 | 3/1974 | Morris et al. | 242/902 X |
| 4,034,930 | 7/1977 | Stevenson | 242/422.4 |
| 4,787,168 | 11/1988 | Benit et al. | 242/902 X |

FOREIGN PATENT DOCUMENTS

| | | | |
|---|---|---|---|
| 206302 | 7/1956 | Australia | 242/129.71 |
| 655716 | 1/1938 | Germany | 242/129.7 |
| 22078 | 9/1910 | United Kingdom | 242/129.7 |
| 607216 | 8/1948 | United Kingdom | 242/129.7 |

*Primary Examiner*—Donald P. Walsh
*Assistant Examiner*—William A. Rivera
*Attorney, Agent, or Firm*—Terry M Gernstein

[57] ABSTRACT

A one-piece hanger element includes a central section which rotatably supports a spool of fishing line and has a shoulder that engages a fishing rod to releasably support the spool of fishing line on the rod while fishing line is fed from the spool to the reel to load that reel. Arms on the hanger element prevent the spool from falling off the central section, and one of the arms is spreadable to adjust the tension on the fishing line as it is fed from the spool to the reel. The hanger element can be sold with the spool as a unit.

3 Claims, 5 Drawing Sheets

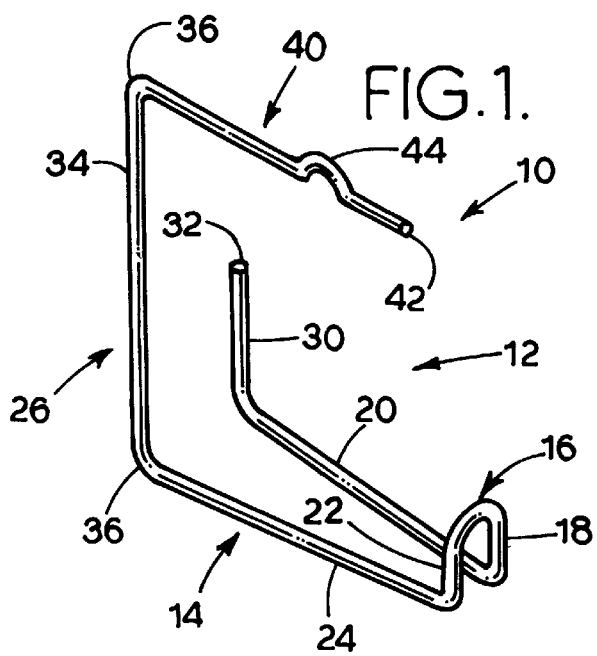
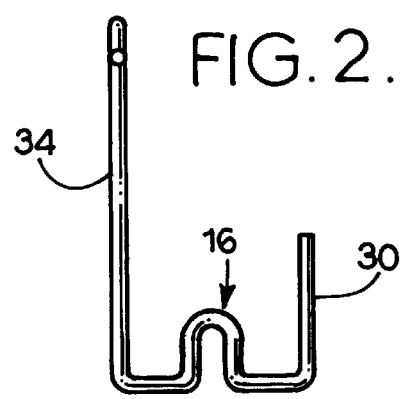
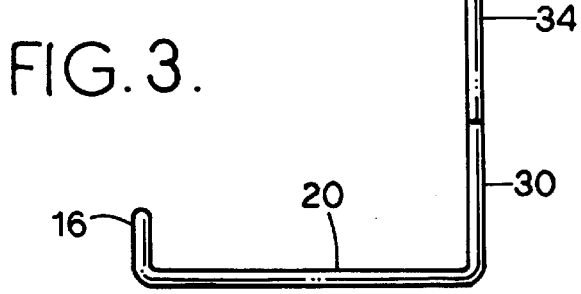
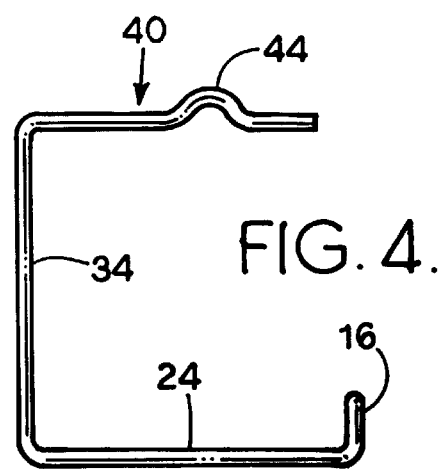

5,839,687

MEANS AND METHOD FOR TRANSFERRING FISHING LINE FROM A STORAGE SPOOL TO A FISHING REEL ON A FISHING ROD

TECHNICAL FIELD OF THE INVENTION

The present invention relates to the general art of winding and reeling, and to the particular field of loading fishing line onto a fishing reel.

BACKGROUND OF THE INVENTION

As is well known to fisherman, the fishing line in a fishing reel must be replaced from time to time. Accordingly, most sporting goods stores sell fishing line. This line is usually sold on spools that are similar to spools of sewing thread. The fisherman transfers the fishing line from the spool to the fishing reel.

As is also well known to fisherman, improper loading of fishing line onto a fishing reel can cause the line to twist. Twisted line inhibits the fishing operation by, among other things, reducing the ability to cast. Therefore, a proper transfer of fishing line from a spool to a fishing reel must be carried out without twisting that line during the loading process.

There are several ways fishermen carry out this procedure. One way is to have someone hold the spool while someone else operates the reel. This works well, but requires two pairs of hands.

Another way is to place the spool on a special machine which feeds the line out as the reel is operated. This process also works well. However, it requires a special machine that may not be readily available when the reloading process is required.

Therefore, there is a need for a means and method for transferring fishing line from a storage spool to a fishing reel which can be carried out effectively, properly and efficiently by only one person without the need of any special machine.

Still further, each fisherman likes to have a particular winding for his reel. That is, the tension applied to the line as it is being loaded onto the reel should be controlled. This is easier to achieve using the special machines than it is by the hand winding method discussed above.

Thus, there is a need for a means for adjusting the tension of fishing line as it is being loaded onto a fishing reel in a hand winding method.

OBJECTS OF THE INVENTION

It is a main object of the present invention to provide means and method for transferring fishing line from a storage spool to a fishing reel that can be carried out by one person.

It is another object of the present invention to provide means and method for transferring fishing line from a storage spool to a fishing reel that can be carried out by one person without the need of a special machine.

It is another object of the present invention to provide means and method for transferring fishing line from a storage spool to a fishing reel that can be carried out by one person without twisting the fishing line during the loading process.

It is another object of the present invention to provide means and method for transferring fishing line from a storage spool to a fishing reel that can be carried out by one person in an efficient manner.

It is another object of the present invention to provide means and method for transferring fishing line from a storage spool to a fishing reel that can be carried out by one person on either closed reels or spinning reels.

It is another object of the present invention to provide means for transferring fishing line from a storage spool to a fishing reel that can be carried out by one person which can be sold as a unit with the storage spool.

It is another object of the present invention to provide a means for adjusting the tension of fishing line as it is being loaded onto a fishing reel in a hand winding method.

SUMMARY OF THE INVENTION

These, and other, objects are achieved by a one-piece hanger element that can be releasably mounted on a fishing rod spaced from the fishing reel to rotatably support a spool of fishing line on the reel in a manner that feeds the line to the reel as necessary to properly transfer the line to the reel.

More specifically, the hanger element includes a section that rotatably mounts the spool on the rod in a manner that maintains the line taut as it is fed from the spool to the reel. The hanger element is easily manufactured and can be sold as a unit with the spool thereby making it accessible to anyone who needs to reload his or her fishing reel when it is convenient to effect this reloading.

BRIEF DESCRIPTION OF THE DRAWING FIGURES

FIG. 1 is a side, rear and top perspective view of the one-piece hanger element embodying the present invention.

FIG. 2 is a rear elevational view thereof.

FIG. 3 is a side elevational view thereof.

FIG. 4 is a side elevational view thereof showing the side opposite to the side shown in FIG. 2.

DETAILED DESCRIPTION OF THE PREFERRED EMBODIMENT OF THE INVENTION

Figure 5:
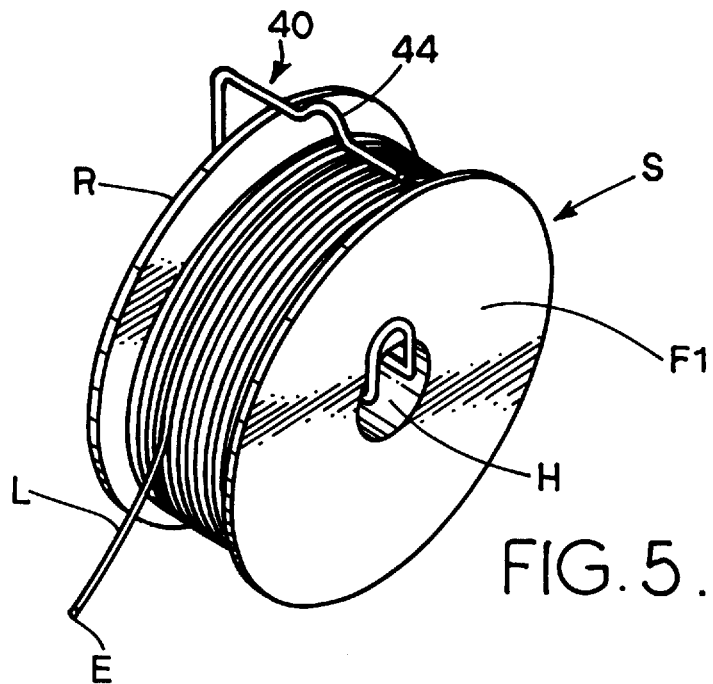
FIG. 5 is a front perspective view showing the hanger element attached to a storage spool.

Shown in FIGS. 1–4 is a hanger element 10 of the present invention. Hanger element 10 is releasably attached to a fishing rod to rotatably support a spool of fishing line on the rod as that fishing line is loaded onto the reel. This permits one person to perform the process of loading the line onto a reel in a manner that is proper and accurate while permitting this loading to be carried out when and where it is most convenient to the fisherman.

More specifically, hanger element 10 is one-piece and includes a U-shaped body 12 having a V-shaped central section 14 that fits through a hole defined in the spool on which the fishing line is stored when the hanger element is in place on that spool. A first arm 16 is U-shaped and has a first leg 18 attached to an end of one portion 20 of central section 14 and a second leg 22 attached to an end of a second portion 24 of central section 14. As can be seen in FIG. 1, the portions of central section 14 converge toward each other and toward first arm 16.

A second arm 26 is on the other end of central section 14. The two arms 16 and 26 prevent the spool from falling off of hanger element 10 as that spool is rotatably supported on central section 14 during the reel loading process. Second arm 26 includes a first section 30 that extends in a direction generally parallel to the direction of first arm 16 and has a free end 32 that is spaced from a plane defined by portions 20 and 24. Second arm 26 further includes a second section 34 that extends from one end 36 of second portion 24 in a direction that is generally parallel to the direction of first arm 16. Second section 34 also includes a second end 36 that is spaced from the plane containing portions 20 and 24 a distance that exceeds the spacing between end 32 and that plane whereby section 34 is longer than section 30.

A shoulder 40 extends from end 36 towards first arm 16 in a direction generally parallel to the plane containing portions 20 and 24 and has a distal end 42 located between first arm 16 and end 36. A rod-engaging hump 44 is U-shaped and is located in shoulder 40.

Hanger element 10 is preferably manufactured from wire or other such material to be inexpensive to manufacture. The material need only be strong enough to support a spool of fishing line on a fishing rod during loading of the fishing reel, and can be discarded when the spool is exhausted.

Figure 6:
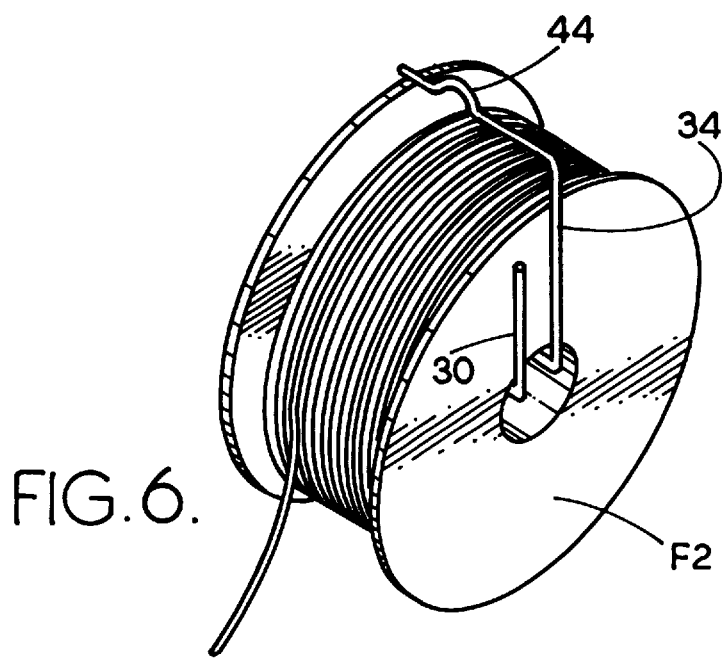
FIG. 6 is a rear perspective element showing the hanger element attached to the storage spool.

As can be seen in FIGS. 5 and 6, hanger element 10 is easily placed on a spool S by inserting central section 14 through hole H in spool S so arms 16 and 26 engage faces F1 and F2 respectively of spool S and shoulder 40 engages rim R of spool S. Hump 44 will be located generally centrally of the spool in position to engage a fishing rod. Arms 16 and 26 prevent the spool from falling off of the hanger element while permitting that spool to rotate on the hanger element in a direction that permits fishing line L to be fed off of the spool onto the fishing reel. Line L has a leading end E as shown in FIG. 5.

The amount of tension placed on the fishing line as it feeds from the spool onto the fishing reel is adjusted by spreading sections 30 and 34 as required.

Figure 7:
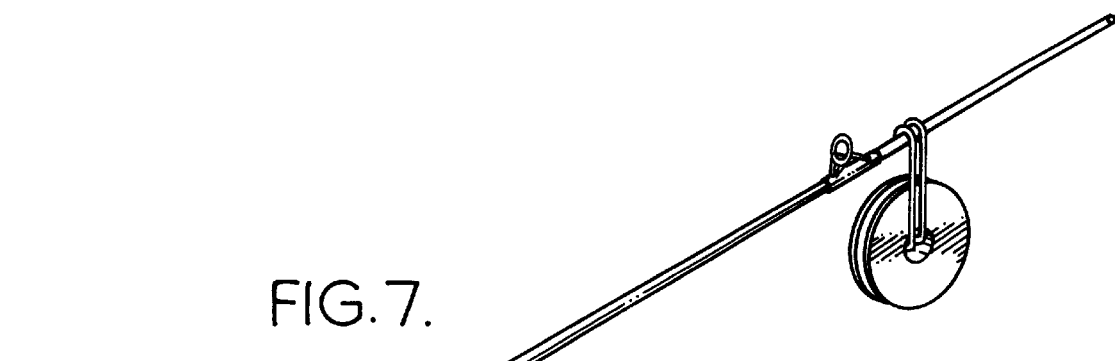
FIG. 7 is a perspective view showing the hanger element attaching a storage spool to a fishing rod with a closed reel.
Figure 8:
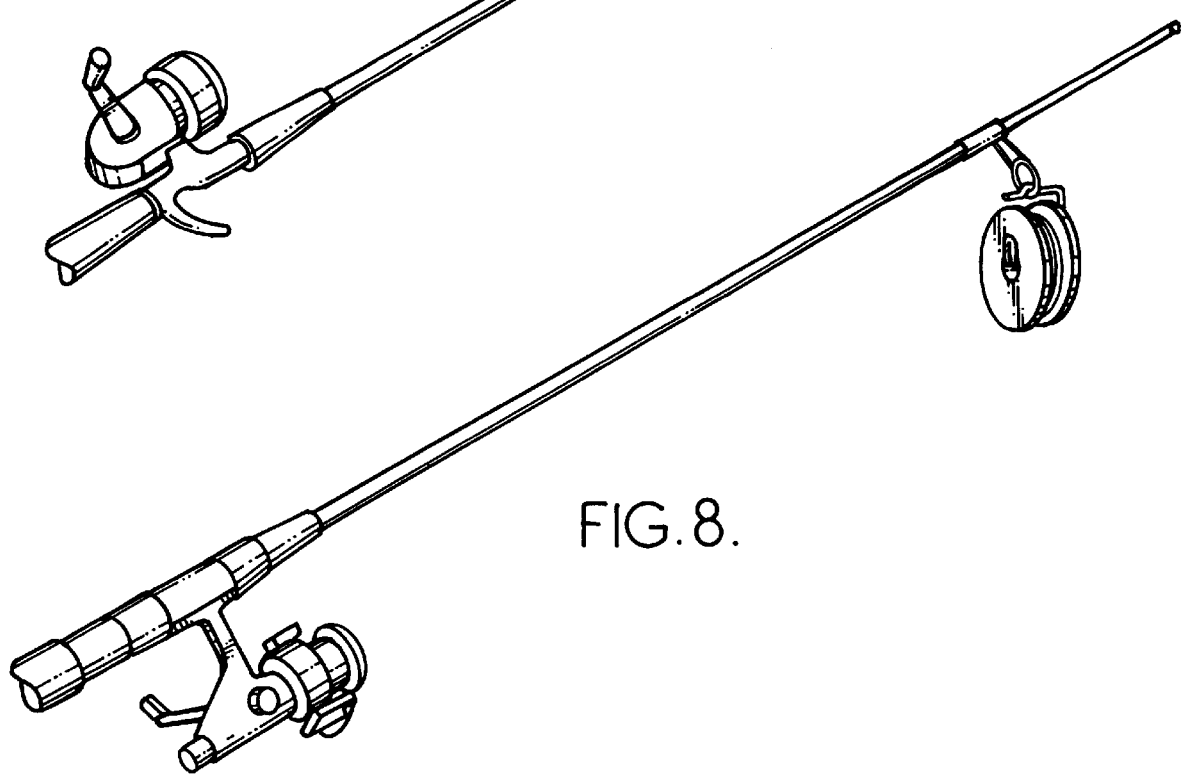
FIG. 8 is a perspective view showing the hanger element attaching a storage spool to a fishing rod with a spinning reel.

As can be seen in FIGS. 7 and 8, hanger element 10 is pendently mounted on a fishing rod F so hump 44 engages the rod adjacent to a projection P of the rod. Fishing line L is then fed from the spool to the fishing reel with leading end E being first attached to the reel R. The proper tension is set by spreading the sections 30 and 34 and the reel is operated to draw fishing line from the spool to the reel. The spool is maintained in place 5 because hanger element 10 abuts projection P and the line is fed properly due to the proper tension being placed on the line. As can be seen in FIGS. 7 and 8, the hanger element can be attached to the rod to load either a closed reel (FIG. 7) or a spinning reel (FIG. 8).

Figure 9:
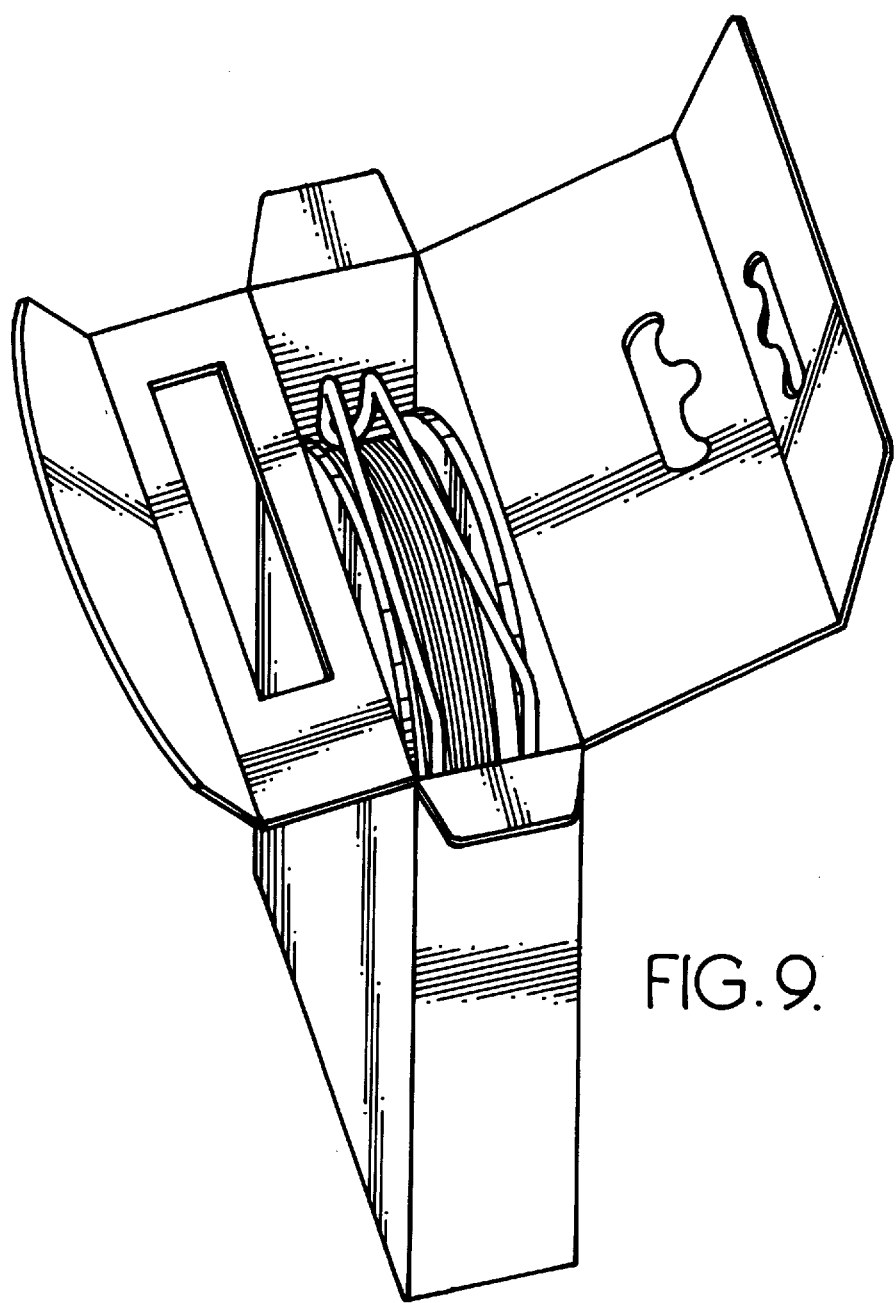
FIG. 9 shows the hanger element as a unit with a spool.

As shown in FIG. 9, hanger element 10 can be placed in a box B containing the spool S of fishing line and the hanger and the spool can be sold as a unit U.

Figure 10:
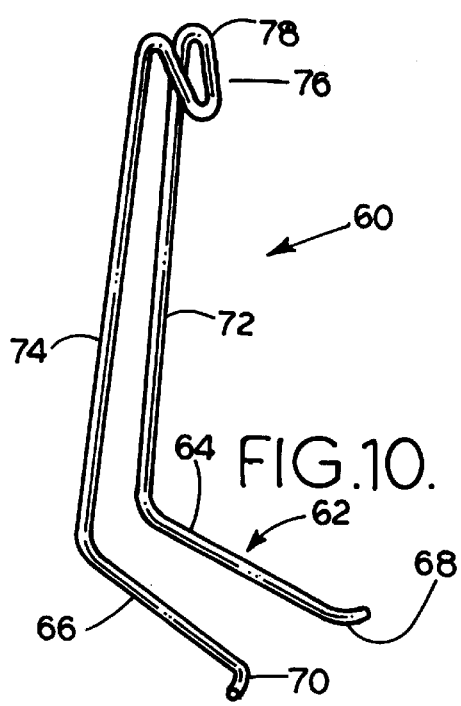
FIGS. 10 and 11 show an alternative form of the hanger element.
Figure 11:
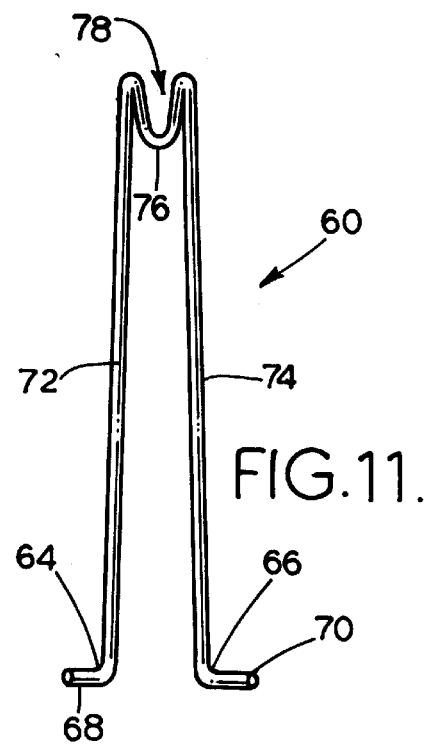

An alternative form of hanger element 60 is shown in FIGS. 10 and 11. Hanger element 60 includes a base 62 formed of two legs 64 and 66 each of which includes a hook 68 and 70 on the distal end thereof. Two legs 72 and 74 extend upwardly from the legs 64 and 66 and converge toward each other at a top end 76. A hook 78 is formed at the top end. The legs 64, 66 are fit through the spool as discussed above, and legs 72, 74 extend up the side of the spool with the hook 78 engaging the spool.

Figure 12:
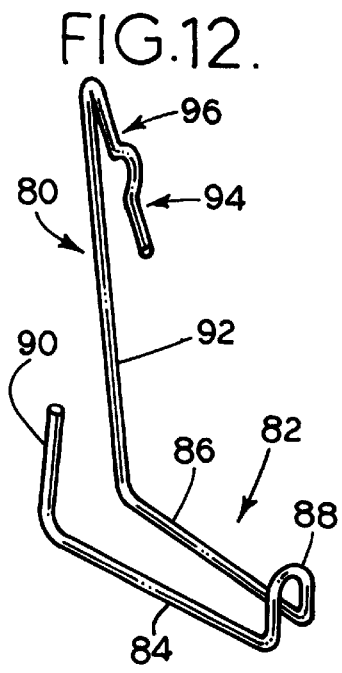
FIGS. 12–14 show another form of the hanger element.
Figure 14:
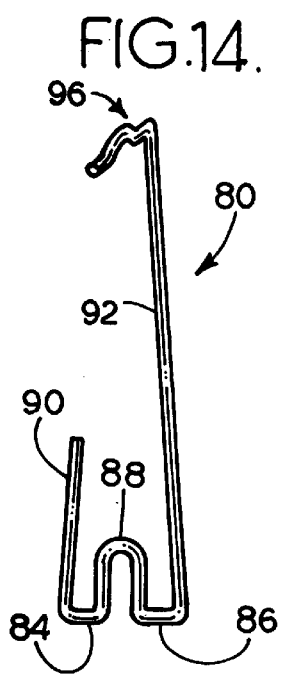
Figure 13:
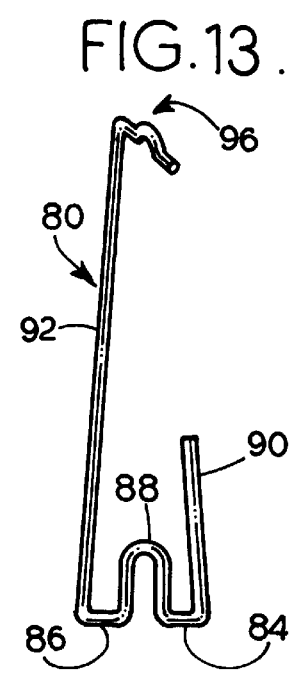

A further alternative form of the hanger is shown in FIGS. 12–14 as hanger 80. Hanger 80 includes a base 82 which includes two legs 84 and 86 which converge toward each other toward end hook 88. A short leg 90 is attached to leg 84 and is located to extend up the side of a spool when the two legs 84 and 86 are inserted through the hole with hook 88 engaging the opposite side of the spool. A long leg 92 is attached to leg 86 to extend up the side of the spool and has a top hook 94 thereon. Top hook 94 includes a crook 96 that engages a rim of the spool when top hook 94 engages the spool. This holds hanger 80 in place on the spool and on the rod.

It is understood that while certain forms of the present invention have been illustrated and described herein, it is not to be limited to the specific forms or arrangements of parts described and shown.

It is claimed:

1. A device for transferring fishing line from a storage spool to a fishing reel comprising: a one-piece hanger element for releasably and rotatably mounting a spool of fishing line on a fishing rod adjacent to a reel of that fishing rod, the spool having a central bore therethrough with the central bore having an inner diameter, said hanger element including a U-shaped body having (1) a central section, a first arm on one end thereof and a second arm on another end thereof, the first arm and the central section being adapted to fit through the central bore in the spool, said first arm being U-shaped and having first and second legs which are spaced apart from each other at one end of each leg, said second arm including a first section and a second section with said first and second sections being spaced apart from each other, the central section including first and second flexible portions connecting said first arm to said second arm, said first flexible portion being connected at one end thereof to the one end of the first leg of said U-shaped first arm and at another end thereof to one end of the first section of said second arm, said second flexible portion being connected at one end thereof to the one end of the second leg of said U-shaped first arm and at another end thereof to one end of the second section of said second arm, said first and second portions being spaced apart from each other and being spaced apart from each other farther from each other adjacent to said second arm than they are adjacent to said first arm to converge in a V-shape toward each other from said second arm to said first arm, the spacing adjacent to said second arm being larger than the inner diameter of the central bore and the spacing adjacent to the first arm being less than the inner diameter of the central bore whereby the first and second portions flexibly engage the spool to apply holding force from the hanger element to the spool adjacent to the central bore when the hanger element is in place on the spool, (2) said first arm being located so the first and second legs of said first arm abut one face of the spool when said hanger element is in place on the spool, (3) said second arm being located so the first and second sections of said second arm abut a second face of the spool when said hanger element is in place on the spool, and (4) a shoulder on the second section of said second arm located to abut a rim of the spool when said hanger element is in place on the spool and to abut an element of the fishing rod to prevent the spool from moving towards the fishing reel as fishing line is removed from the spool and loaded onto the fishing reel, the shoulder on said second arm being spaced from the connection between said second flexible portion and the second section of the second arm and extending toward said first arm, said shoulder including a distal end spaced from said second arm and a rod-engaging hump between said second arm and the distal end of said shoulder, said shoulder being shorter than said central section whereby the distal end of said shoulder is located between the faces of the spool when the hanger element is in place on the spool.

2. The device defined in claim 1 wherein said second arm includes means for adjusting the tension on fishing line as the fishing line is fed from the spool to the reel.

3. The device defined in claim 1 wherein said hump extends away from said central section to be concave with respect to said central section.

* * * * *